(12) United States Patent
Kamerbeek et al.

(10) Patent No.: US 9,656,798 B2
(45) Date of Patent: May 23, 2017

(54) CAPSULE, SYSTEM AND METHOD FOR THE PREPARATION OF A BEVERAGE AND A METHOD FOR MANUFACTURING SUCH A CAPSULE

(75) Inventors: Ralf Kamerbeek, De Meern (NL); Cornelis van Bergen, Houten (NL); Angenita Dorothea van Loon-Post, Utrecht (NL); Hendrik Cornelis Koeling, Amersfoort (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 355 days.

(21) Appl. No.: 13/324,756

(22) Filed: Dec. 13, 2011

(65) Prior Publication Data

US 2012/0251669 A1 Oct. 4, 2012

Related U.S. Application Data

(63) Continuation of application No. PCT/NL2009/050838, filed on Dec. 30, 2009.

(30) Foreign Application Priority Data

Jun. 17, 2009 (EP) .................................... 09162917
Jun. 17, 2009 (EP) .................................... 09162927

(Continued)

(51) Int. Cl.
*B65D 85/804* (2006.01)
*A47J 31/36* (2006.01)
(Continued)

(52) U.S. Cl.
CPC .......... *B65D 85/8043* (2013.01); *A23F 5/262* (2013.01); *A47J 31/0673* (2013.01);
(Continued)

(58) Field of Classification Search
CPC .. B65D 85/8043; B65D 65/466; A47J 31/005; A47J 31/0663; A47J 31/0673; A47J 31/368; A47J 31/407; A23F 5/262
See application file for complete search history.

(56) References Cited

U.S. PATENT DOCUMENTS 2,005,390 A * 6/1935 Pool .............................. 139/452
2,292,101 A 8/1942 William
(Continued)

FOREIGN PATENT DOCUMENTS

BY 11308 C1 12/2008
CA 2072300 1/1993
(Continued)

OTHER PUBLICATIONS

Translation EP 0 844 195, May 1998.*
(Continued)

*Primary Examiner* — Erik Kashnikow
*Assistant Examiner* — Chaim Smith
(74) *Attorney, Agent, or Firm* — Foley & Lardner LLP

(57) ABSTRACT

Capsule for preparing a predetermined quantity of beverage suitable for consumption using an extractable product, for instance roast and ground coffee, comprising a circumferential first wall, a second wall closing the circumferential first wall at a first end, a perforate and/or porous third wall closing the circumferential first wall at a second, open, end opposite the second wall arranged for draining the prepared beverage from the capsule, wherein the first, second and third wall enclose an inner space comprising the extractable product, wherein the extractable product in the inner space of the capsule has been, at least partly compacted. The invention further relates to a method for manufacturing such a capsule, a system comprising such a capsule for preparing a beverage and a method for preparing of a beverage.

20 Claims, 4 Drawing Sheets

(30) Foreign Application Priority Data

Jun. 17, 2009 (EP) .................................... 09162941
Jun. 17, 2009 (EP) .................................... 09162984

(51) Int. Cl.
  *A23F 5/26* (2006.01)
  *A47J 31/40* (2006.01)
  *B65D 65/46* (2006.01)
  *A47J 31/00* (2006.01)
  *A47J 31/06* (2006.01)

(52) U.S. Cl.
  CPC ........... *A47J 31/368* (2013.01); *A47J 31/407* (2013.01); *B65D 65/466* (2013.01); *A47J 31/005* (2013.01); *A47J 31/0663* (2013.01)

(56) References Cited

U.S. PATENT DOCUMENTS

| | | |
|---|---|---|
| 3,445,237 A | 5/1969 | Gidge |
| 3,615,708 A | 10/1971 | Abile-Gal |
| 3,811,373 A | 5/1974 | Telco |
| 3,844,206 A | 10/1974 | Weber |
| 4,321,139 A | 3/1982 | Auclair |
| 4,417,504 A | 11/1983 | Yamamoto |
| 4,853,234 A | 8/1989 | Bentley et al. |
| 4,859,337 A | 8/1989 | Woltermann |
| 4,860,645 A | 8/1989 | van der Lijn et al. |
| 4,921,712 A | 5/1990 | Malmquist |
| 4,995,978 A | 2/1991 | Van de Gang |
| 5,008,013 A | 4/1991 | Favre et al. |
| 5,325,765 A | 7/1994 | Sylvan et al. |
| 5,840,189 A | 11/1998 | Sylvan et al. |
| D408,679 S | 4/1999 | Potts et al. |
| 5,906,845 A | 5/1999 | Robertson |
| 6,025,000 A * | 2/2000 | Fond et al. .................. 426/433 |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| 6,777,007 B2 | 8/2004 | Cai |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,383,763 B2 | 6/2008 | Dijs |
| 7,398,726 B2 | 7/2008 | Streeter et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,624,673 B2 | 12/2009 | Zanetti |
| 7,640,845 B2 | 1/2010 | Woodnorth et al. |
| 7,856,920 B2 | 12/2010 | Schmed et al. |
| 8,808,777 B2 | 8/2014 | Kamerbeek et al. |
| 2002/0078831 A1 | 6/2002 | Cai |
| 2002/0088807 A1 | 7/2002 | Perkovic et al. |
| 2003/0005826 A1 * | 1/2003 | Sargent et al. .................. 99/279 |
| 2003/0039731 A1 * | 2/2003 | Dalton et al. .................. 426/433 |
| 2003/0096038 A1 | 5/2003 | Cai |
| 2004/0045443 A1 | 3/2004 | Lazaris et al. |
| 2005/0051478 A1 | 3/2005 | Karanikos et al. |
| 2005/0158426 A1 | 7/2005 | Hu et al. |
| 2005/0183581 A1 * | 8/2005 | Kirschner et al. .............. 99/295 |
| 2005/0205601 A1 | 9/2005 | Taylor |
| 2005/0287251 A1 | 12/2005 | Lazaris et al. |
| 2006/0174773 A1 | 8/2006 | Taylor |
| 2006/0292012 A1 | 12/2006 | Brudevold et al. |
| 2007/0148290 A1 * | 6/2007 | Ternite .............. B65D 85/8043 426/90 |
| 2007/0181005 A1 * | 8/2007 | Kirschner et al. .............. 99/295 |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2008/0257165 A1 | 10/2008 | Bolzicco et al. |
| 2009/0098253 A1 | 4/2009 | Diaz Blanco |
| 2010/0024658 A1 | 2/2010 | Jacobs et al. |
| 2010/0043646 A1 | 2/2010 | Suggi Liverani et al. |
| 2010/0303964 A1 | 12/2010 | Beaulieu et al. |
| 2012/0276252 A1 | 11/2012 | Bunke et al. |
| 2013/0122156 A1 | 5/2013 | Fisk et al. |

FOREIGN PATENT DOCUMENTS

| | | | |
|---|---|---|---|
| CA | 2325978 A1 | 11/2000 | |
| CA | 2470638 A1 | 7/2003 | |
| CA | 2236733 C | 9/2006 | |
| CH | 434609 A | 10/1967 | |
| EP | 0 114 717 | 8/1984 | |
| EP | 0 211 511 A1 | 2/1987 | |
| EP | 0 361 569 | 4/1990 | |
| EP | 0 493 856 | 7/1992 | |
| EP | 0 524 464 | 1/1993 | |
| EP | 0 524 464 A1 | 1/1993 | |
| EP | 0 844 195 * | 5/1998 | ............ B65D 81/00 |
| EP | 0844195 | 5/1998 | |
| EP | 0 904 717 A1 | 3/1999 | |
| EP | 1 101 430 | 5/2001 | |
| EP | 1 579 791 | 9/2005 | |
| EP | 1 580 144 | 9/2005 | |
| EP | 1 854 741 | 11/2007 | |
| EP | 1 867 584 | 12/2007 | |
| EP | 1 882 431 * | 1/2008 | ............ A47J 31/00 |
| EP | 1 997 748 | 12/2008 | |
| EP | 2 230 195 A1 | 9/2010 | |
| FR | 757358 | 12/1933 | |
| FR | 1543608 | 10/1968 | |
| FR | 2127329 | 10/1972 | |
| FR | 2617389 A1 | 1/1989 | |
| GB | 2 437 483 A | 10/2007 | |
| JP | 05-199938 | 8/1993 | |
| JP | 06-046815 | 2/1994 | |
| JP | 2003-265320 | 9/2003 | |
| JP | 2007-530107 | 11/2007 | |
| JP | 2008-509720 | 4/2008 | |
| RU | 2337601 | 11/2008 | |
| WO | WO-03/105644 | 12/2003 | |
| WO | WO 2005/092160 * | 10/2005 | ............ A47J 31/06 |
| WO | WO-2005/092162 A1 | 10/2005 | |
| WO | WO-2006/003115 | 1/2006 | |
| WO | WO-2006/016813 A2 | 2/2006 | |
| WO | WO-2006/126104 A2 | 11/2006 | |
| WO | WO-2007/118914 A1 | 10/2007 | |
| WO | WO-2007/131559 | 11/2007 | |
| WO | WO 2007/135135 | 11/2007 | |

(56) References Cited

FOREIGN PATENT DOCUMENTS

| | | |
|---|---|---|
| WO | WO-2007/135136 | 11/2007 |
| WO | WO 2008/012202 | 1/2008 |
| WO | WO 2008/121489 | 10/2008 |
| WO | WO-2009/053811 A2 | 4/2009 |

OTHER PUBLICATIONS

Office Action for Japanese Application No. 2012-516021, with English Translation; mail date Aug. 27, 2013, 4 pages.
Office Action for Japanese Application No. 2012-516020, with English Translation; mail date Aug. 7, 2013, 6 pages.
First Office Action and Search Report for Chinese Patent Application No. 200980160981.3, mail date Dec. 24, 2013, 10 pages.
Office Action for Russian Patent Application No. 2012101438, dated Jun. 9, 2014 with English translation, 8 pages.
International Search Report for PCT Application No. PCT/NL2009/050838, completed Feb. 19, 2010, 5 pages.

\* cited by examiner ively low extraction pressure, while CO2 is important for creating foam.

CAPSULE, SYSTEM AND METHOD FOR THE PREPARATION OF A BEVERAGE AND A METHOD FOR MANUFACTURING SUCH A CAPSULE

CROSS-REFERENCE TO RELATED APPLICATIONS

The present application is a continuation of International Patent Application Serial No. PCT/NL2009/050838 filed on Dec. 30, 2009; which claimed priority to European Application Nos. EP09162984.0 filed on Jun. 17, 2009, EP09162941.0 filed on Jun. 17, 2009, EP09162917.0 filed on Jun. 17, 2009, and EP09162927.9 filed on Jun. 17, 2009—all of which are hereby incorporated herein by reference.

BACKGROUND

The invention relates to a capsule for preparing a predetermined quantity of beverage suitable for consumption using an extractable or a soluble product, for instance roast and ground coffee, comprising a circumferential first wall, a second wall closing the circumferential first wall at a first end, a perforate and/or porous third wall closing the circumferential first wall at a second, open, end opposite the second wall arranged for draining the prepared beverage from the capsule, wherein the first, second and third wall enclose an inner space comprising the extractable product.

Such capsules are known per se and can be used in an apparatus for preparing a beverage. They provide convenience in use as well as reproducible extraction conditions, resulting in easy preparation of a cup of coffee with a constant quality. The known capsule can be an open capsule, comprising a circumferential wall and an exit area adapted for draining prepared beverage from the capsule. In the inner space of the capsule, an amount of extractable product, such as roast and ground coffee is provided, for instance by providing an amount of coffee with a smaller volume than the volume of the inner space. Such a capsule can be used in a beverage production apparatus in which a liquid under pressure enters the capsule in order to interact with the extractable product in the capsule and to drain the beverage from the capsule out of the apparatus into a container, such as a coffee cup.

When using the known capsule with an open exit area and loosely provided roast and ground coffee, water supplied to the capsule may rush through the capsule resulting in a less than desired pressure build-up inside the capsule, thereby extracting the coffee with a relatively low extraction pressure. This may result in an uncontrolled beverage preparation process which may adversely affect the prepared beverage. Especially, the quality of the coffee may be inferior, for instance because due to a lower extraction pressure, the coffee may be watery or an inferior foam layer due to a lower CO2 content of the coffee beverage that occurs when extracting at lower extraction pressure, while CO2 is important for creating foam.

SUMMARY

It is an object of the invention to provide an improved capsule for the preparation of a beverage and more specifically to at least diminish the above problem.

Thereto, according to a first aspect of the invention, a capsule of the above described type is provided, wherein the extractable product in the inner space of the capsule has been, at least partly compacted.

By compressing the extractable product in the capsule, the roast and ground coffee is pressed against the walls of the inner space of the exchangeable capsule, thereby preventing occurrence of preferential fluid flow paths along the respective walls of the capsule. This also may be advantageous in case the capsule has to be placed in an apparatus such that the circumferential side wall is facing downwards and the exit filter is directed sideways. By providing a capsule with compacted coffee inside, also in a rotated position of the capsule, the coffee stays located next to the entire exit filter, thereby preventing preferential fluid flow paths. Consequently, the supplied fluid, such as water, is directed from the entrance area through the coffee bed to the exit area of the capsule independent of the position of the capsule, providing a controlled beverage preparation. Thus, by compressing the coffee, the speed of the fluid flow can be controlled between the entrance area and the exit area of the exchangeable capsule. Furthermore, such a compressed coffee bed together with the exit area of the coffee provides a desired flow restriction within the capsule during preparation of the beverage. This allows a higher extraction pressure building up within the inner space of the capsule, thereby providing a higher extraction pressure to build up in case the capsule. For instance, such that a coffee beverage with a desired strength and with a higher CO2 content resulting in a high quality coffee beverage with a foam layer may be provided.

Preferably, the extractable product comprises roasted and ground coffee, for instance an amount suitable for preparing a single portion of beverage, preferably a single cup of the beverage, e.g. from 30-200 ml of the prepared beverage. The capsule may therefore comprise 4.0-8.0 grams or 4.5-8 grams, preferably 5.0-6.5 grams, more preferably approximately 5.2 grams±0.15 grams, still more preferably 5.3±0.2 grams of roast and ground coffee. For instance, a capsule comprising approximately 5.3 grams may be used for preparing a cup of espresso coffee and a capsule comprising approximately 6.0 grams±0.15 grams may be suitable for preparing a cup of coffee longo. Of course, capsule comprising other amounts of coffee between 4.0 and 8.0 grams may be used for preparing other kinds of coffee. The exchangeable capsule, thus, is a single-portion-pack. Hence, the capsule is suited for preparing a predetermined amount of coffee by supplying a predetermined amount of hot water under high pressure to the capsule. A capsule comprising the mentioned amount of coffee provides a coffee beverage with a favorable amount of foam, a desired amount of soluble dry matter extracted from the coffee starting material. It is noted that a favorable amount of foam preferably is at least about 5 ml of foam, or more, for instance 9 ml of foam, on top of a prepared beverage comprising about 40 ml. Furthermore, the capsule comprises a distribution of the particles loose enough to prevent formation of a flow restriction in the entire coffee bed preventing an undesired long preparation time of the beverage and a large amount of coffee oil comprised in the beverage.

In further elaboration of the invention, the inner space of the capsule preferably has a volume of approximately 10-14 ml, preferably 11.5-12.5 ml, more preferably approximately 11.8 ml.

It is advantageous if the entire inner space is occupied by the extractable product, for instance the roast and ground coffee. Hence, optimum use may be made of the gain in internal volume of the capsule when matching densities of the ground coffee are used. This further provides the advantage that the extractable product cannot be displaced entirely inside the inner space when the fluid flows through the capsule, so that no preferential paths can be formed. Furthermore, because the entire inner space is occupied with the coffee, no water will remain inside the capsule between the coffee and the respective side walls after preparing the beverage. Therefore, the capsule can be removed from the apparatus with a minimum risk of soiling the apparatus because of water leaking from the capsule.

It has been found by the applicant, that it is advantageous according to a further elaboration of the invention, if the roast and ground coffee is compressed such that the compressed coffee in the inner space of the capsule comprises a substantially homogenous density. During use, the particles of such homogenous coffee inside the capsule may be redistributed resulting in a relatively loose coffee bed layer adjacent the second wall, thus the entrance area of the capsule and a relatively compact coffee bed layer adjacent the third wall, thus the exit area of the capsule. Such compact coffee bed layer together with the exit filter provides a filtering capacity of the capsule with a desired pressure drop. Thus, the compact coffee bed layer and the exit filter together provide retarding of the outflow of the prepared coffee beverage from the capsule.

It will be appreciated that before the capsule is filled with the coffee, coffee mass may be densified, for example by allowing a suitable flow of roast and ground coffee to pass through a diaphragm under pressure.

The filtering capacity may be further improved if, according to a further embodiment of the invention, the roast and ground coffee comprises a particle size distribution by weight, wherein a 10th percentile thereof has a particle size of 20-60 µm, preferably smaller than 40 µm (for example, 33-37 µm), wherein a 50th percentile thereof has a particle size of 370-470 µm, (preferably 370-570 µm), preferably smaller than 490 µm and wherein a 90th percentile thereof has a particle size of 600-800 µm, preferably smaller than 700 µm. Such a particle size distribution of the roast and ground coffee inside the capsule prevents collapsing of the coffee bed upon pressurizing the coffee with water. Due to the compression of the coffee, the relatively small particles may be enclosed by the relatively large particles such that the relatively small particles can not displace towards the exit filter before the preparation of the beverage. When supplying water to the inner space of the capsule, the relatively small particles may flow with the water towards the exit filter to form the flow restriction together with said exit filter. At the same time such particle size distribution provides a high quality coffee with a good taste. If the overall particle size is too small, the coffee bed may collapse such that prepared beverage can not easily pass through resulting in an undesired high beverage preparation time. If, on the other hand, the overall particle size is too large, the supplied fluid will rush through the coffee, resulting in watery coffee beverage comprising a low concentration of dissolved dry matter without having a foam layer.

It is noted that the above mentioned preferential particle size distribution according to the invention is determined by means of a commonly known Sympatec analyzer that is suitable for determining particle distribution and size in dry products. Such an analyzer may be a Sympatec Central Unit "Helos" used in combination with a dry dispersion system Rodos T4.1 unit. The used measuring range R7 comprises 0.5/18.0-3500 µm. A sample is positioned in the measuring unit. By means of laser diffraction technology, the particle size distribution of said sample is determined. The light emitted by the laser is diffracted by the sample particles. The amount of diffraction is dependent on the particle size of the roast and ground coffee of the sample. The diffused light is detected by a detector after passing a lens, said lens being a R7 lens.

It is found that the end product, i.e. the compacted extractable product has a particle size distribution by weight wherein a 10th percentile of the particle size is 20-60 µm, preferably smaller than 40 µm, wherein a 50th percentile of the particle size is 400-600, preferably 450-550 µm and wherein a 90th percentile of the particle size is 700-1000 µm, preferably 825-950 µm.

It will be appreciated that the particle size of the compacted extractable product maybe slightly larger than the particle size of the starting material because particles may stick together when compressed.

According to another aspect of the invention, the third wall comprises an exit filter for draining prepared beverage from the capsule, wherein the exit filter for instance is formed by filtering paper or a polymeric film provided with a plurality of exit openings. In use such an exit filter together with a compact coffee bed layer adjacent the filter provides a desired flow restriction that may result in a coffee beverage with a good quality and good taste. It will be appreciated that the exit openings may be evenly spread over diameter of the capsule, preferably not covering regions of the flange. By using filtering paper as the exit filter a low-cost third wall is provided. Furthermore, the third wall being of filtering paper may result in filtering oil from the beverage, i.e. from the coffee, before supplying the coffee to the container, such as the cup. This may be advantageous to reduce the amount of oils in the coffee which may adversely affect the taste and/or quality of the coffee. It is especially advantageous to filter cafestol from the coffee, since cafestol is understood to raise the blood cholesterol content. Moreover, the third wall being porous may provide the advantage that the beverage can be drained from the capsule over substantially the entire cross section of the inner space. Hence, the beverage can flow out the inner space very homogeneously. This may prevent the existence of preferential fluid flow paths inside the inner space. Preferential fluid flow paths are known to reduce reproducibility of the process of preparing the beverage.

It is advantageous if the exit filter, for instance of the polymeric film, comprises 100-170 openings, preferably 110-150, more preferably approximately 145 openings, wherein an opening diameter is between 0.4 mm±0.05 mm and 0.2 mm±0.05 mm, preferably approximately 0.3 mm±0.05 mm. Such exit openings together with the relatively small coffee particles that are redistributed during water supply and located adjacent the openings may provide the desired flow restriction and thus pressure drop. Due to said openings, the prepared beverage will leave the capsule with a desired speed such that the preparation time will not be too long, for instance no more than 40 seconds, preferably no more than 30 seconds. Furthermore, the openings are small enough to prevent coffee particles from leaving the capsule and ending up in the cup with prepared coffee beverage. The preferred amount of openings in the exit filter enables the exit filter together with the compact coffee bed layer adjacent the filter to form a desired flow restriction such that a coffee beverage with an acceptable oil balance, a desired brewing strength and an acceptable preparation time is obtained. Such a coffee beverage will have a good quality and good taste.

In further elaboration, the first circumferential wall is substantially rigid. In general, the circumferential first wall may have any shape such as cylindrical, hemispherical, frustoconical or polygonal, such as hexagonal or octagonal.

Preferably, the capsule comprises an entrance filter, wherein the entrance filter has a flow resistance that is lower than the flow resistance of the compacted extractable product in combination with the exit filter, avoiding excessive pressure build-up upstream of the entrance filter. This is favorable since such upstream pressure build-up does not contribute to the brewing of the beverage.

According to a further aspect of the invention, the extractable product is compacted into a tablet. This provides the advantage that the risk of preferential fluid flow paths occurring in the compacted extractable product tablet is reduced. It will be appreciated that when using the compacted tablet, the second wall may be omitted from the capsule, as the risk of spilling extractable product is greatly reduced.

In further elaboration of the invention, the tablet may comprise at least one bore extending from the side of the tablet facing the second wall in the direction of the third wall. The bore thus provides an infusion means for wetting the tablet in a homogeneous manner.

It is also possible that the extractable product is compacted into a plurality of tablets, preferably of mutually different packing density. It is for instance possible that the extractable product is provided as a single stack of tablets having mutually different degrees of compacting. It is for instance possible that the degree of compacting increases per tablet in the direction from the second wall to the third wall. In this way the effort required to completely wet a tablet will also increase in the direction from the second wall to the third, ensuring that each upstream tablet has been properly wetted when wetting a more downstream tablet, thus providing very homogeneous wetting of the total volume of extractable product.

The invention further relates to a method for manufacturing the above described capsule, comprising:

providing a coffee receiving cup comprising the circumferential first wall and one of the second and third walls defining an inner space arranged for receiving roast and ground coffee starting material;

providing an amount of roast and ground coffee starting material in the inner space of the coffee receiving cup;

compressing the amount of roast and ground coffee starting material such that the capsule comprises compacted coffee. The total amount of coffee may be provided in the inner space of the capsule and subsequently be compressed to compact said amount of coffee.

In an alternative embodiment of the method of the invention, the method may comprise:

providing a first part of the amount of roast and ground coffee starting material in the inner space;

compressing said first part such that the first part is compacted;

subsequently providing a further part of the amount of roast and ground coffee starting material on top of the compressed first part in the inner space of the capsule;

compressing the further part such that the further part is compacted. By alternately providing and compressing parts of the amount of coffee, the coffee may be more easily inserted in the capsule and at the same time risk of spoiling coffee starting material may be reduced.

It is also possible according to a further aspect of the invention, that the coffee starting material that is inserted in the inner space of the capsule is condensed by means of vibration prior to compressing said coffee starting material.

Preferably, the compacted volume of the roast and ground coffee is substantially similar to a volume of the inner space of the coffee receiving cup.

Such a method provides the advantage that distribution of the coffee particles inside the coffee receiving cup of the exchangeable capsule can be determined during the manufacturing process. The distribution of the coffee particles thus can be homogenous, wherein relatively small particles may be enclosed by relatively large particles. Due to the compaction of the coffee, the distribution will not considerably change during for instance transport of the exchangeable capsules. Consequently, the predetermined distribution of the particles inside the capsule may remain intact. By preparing a beverage with such a capsule, the coffee preparation process may be controllable and reproducible.

Furthermore, by compacting the coffee in the inner space of the capsule, a flat surface is provided at the side of the exchangeable capsule to which the exit filter has to be connected. Such a flat surface enhances tight sealing of the exit filter onto the circumferential first wall of the exchangeable capsule, thereby preventing occurrence of apertures between for instance the foil of the exit filter and the first wall. This may result in a capsule of inferior quality that may produce an inferior quality of beverage because due to such apertures, coffee and fluid may leak there through without passing the exit filter.

Compaction of the coffee further increases the sealing quality of the exit filter onto the circumferential first wall because the risk of coffee particles being located on the circumferential first wall surface is decreased. Thus, sealing quality of the exit filter along the entire circumferential first wall may not be diminished due to particles between the filter and the wall.

In a further elaboration of the method according to the invention, the roast and ground coffee is compressed with a compressive pressure of substantially 50-300N, preferably 50-500N, preferably of substantially 400-600N. Good results have been achieved with a compressive pressure of about 500N.

In order to provide the predetermined amount of roast and ground coffee starting material in the inner space of the coffee receiving cup with a volume of approximately 10-14, ml, preferably of 11.5-12.5 ml, more preferably of approximately 11.8 ml, it is preferable that a pouring volume of the roast and ground coffee starting material is preferably in the range of 600-750 ml per 250 grams of coffee starting material (preferably in the range of 620-670 ml per 250 grams of coffee starting material) and more particularly about 630-660 ml per 250 grams of coffee starting material. With such a pouring volume, the roast and ground coffee after compression may have a weight of 4.0-8.0 grams, preferably of 5.0-6.5 grams, more preferably of approximately 5.3 grams±0.2 grams.

Applicant found that if an exchangeable capsule according to the invention comprises coffee with a pouring volume of less than 600 ml per 250 grams of coffee starting material, a prepared cup of coffee using said capsule results in a watery cup of coffee without a nice foam layer. It will be appreciated that the pouring volume in this aspect relates to a condition of the coffee post densification step, yet before the step of compacting in the capsule. Furthermore, the coffee beverage may then comprise a relatively large amount of coffee oil, which negatively influences the quality of the prepared beverage. A high pouring volume, higher than the preferred volume as mentioned above, is also undesirable because it may result in a too long beverage preparation time.

It is noted that the pouring volume of coffee starting material is determined by measuring the volume of 250 g of coffee after grinding post densification. In order to determine this volume, an amount of roast and ground coffee starting material is poured from a funnel into a tray provided there under to that end, which tray has a volume of 250 ml. The tray has a slide which is closed, so that the volume of coffee grindings of 250 ml remains in the tray. Then, the weight of the coffee grindings in the tray is determined and converted into a pouring volume expressed in ml/250 g.

Furthermore, it is desirable that according to a further aspect of the invention, the roast and ground starting material has a moisture content of 1.0-4.0%, preferably of 1.5-2.2%, more preferably of approximately 1.5% before compacting the roast and ground starting material in the inner space of the capsule. The moisture content of the coffee starting material is formed in that the coffee starting material is quenched with moisture before the coffee starting material is ground. The moisture content is determined by measuring an extent of weight loss of 5 g coffee starting material as a result of drying the coffee starting material in an oven for 3 hours at 103° C.

Preferably, according to a further embodiment of the method according to the invention, the coffee beans intended for the roast and ground coffee starting material are roasted during approximately 250-1000 seconds, preferably during 450-700 seconds, wherein a degree of roast of the roast and ground coffee starting material preferably is in the range of 30-60 units according to a measuring technique described below. An exchangeable capsule comprising such roast and ground coffee provides a cup of coffee beverage with a nice flavor comprising an acceptable amount of coffee oil. Such a degree of roast further provides roast and ground coffee starting material that can be compacted in a desired manner with a desired pressure as mentioned before. The degree of roast of the coffee starting material is determined by measuring the reflection of light on a leveled amount of ground coffee starting material. This can be carried out with, for instance, a color analyzer LK100, type LMG163 of Dr. Bruno Lange GmbH. An amount of light, for instance of a wavelength of 640 nm, is directed at a sample comprising said leveled amount of grindings. Depending on the darkness of the grindings, an amount of light is reflected and measured. The value indicates the degree of roast. Said color analyzer is calibrated daily by subsequently using two calibration tiles. Thereafter said calibration tiles are measured and then the sample is measured. If needed, the roasted beans are grind to a particle size fine ¾, having an average particle size of approximately 0.39 mm. Leveling off the coffee should be dome by keeping a ruler upright and making a 90 degree angle with the surface of the coffee. The coffee is leveled off in three smooth movements (to and fro) over the brim of the sample-dish. If obvious irregularities are determinable on the coffee surface, leveling should be done again.

In further elaboration of the invention, the coffee beans are grinded to provide roast and ground starting material with a with a particle size distribution by weight, wherein a 10th percentile of the particle size is 20-60 µm, preferably smaller than 40 µm, wherein a 50th percentile of the particle size is 370-570 µm, preferably smaller than 490 µm and wherein a 90th percentile of the particle size is 600-800 µm, preferably smaller than 700 µm. When compressing such roast and ground starting material in the inner space of the capsule, a predetermined homogenous distribution of the particles can be provided as explained before.

The invention also relates to a capsule obtainable by the above described method and to a system for preparing a predetermined quantity of beverage suitable for consumption according to claim 28 and to a method for preparing a predetermined quantity of beverage suitable for consumption according to claim 30.

Further advantageous embodiment 1.0-4.0%, preferably of 1.5-2.2%, more preferably of approximately 1.5% of the capsule, the method for manufacturing such a capsule, the system and the method for preparing a beverage according to the invention are set forth in the dependent claims.

BRIEF DESCRIPTION OF THE DRAWINGS

The invention will now be further elucidated by means of, non-limiting, examples referring to the drawing, in which.

It is noted that identical or corresponding elements in the different drawings are indicated with identical or corresponding reference numerals.

DESCRIPTION OF EXEMPLARY EMBODIMENTS

Figure 1:
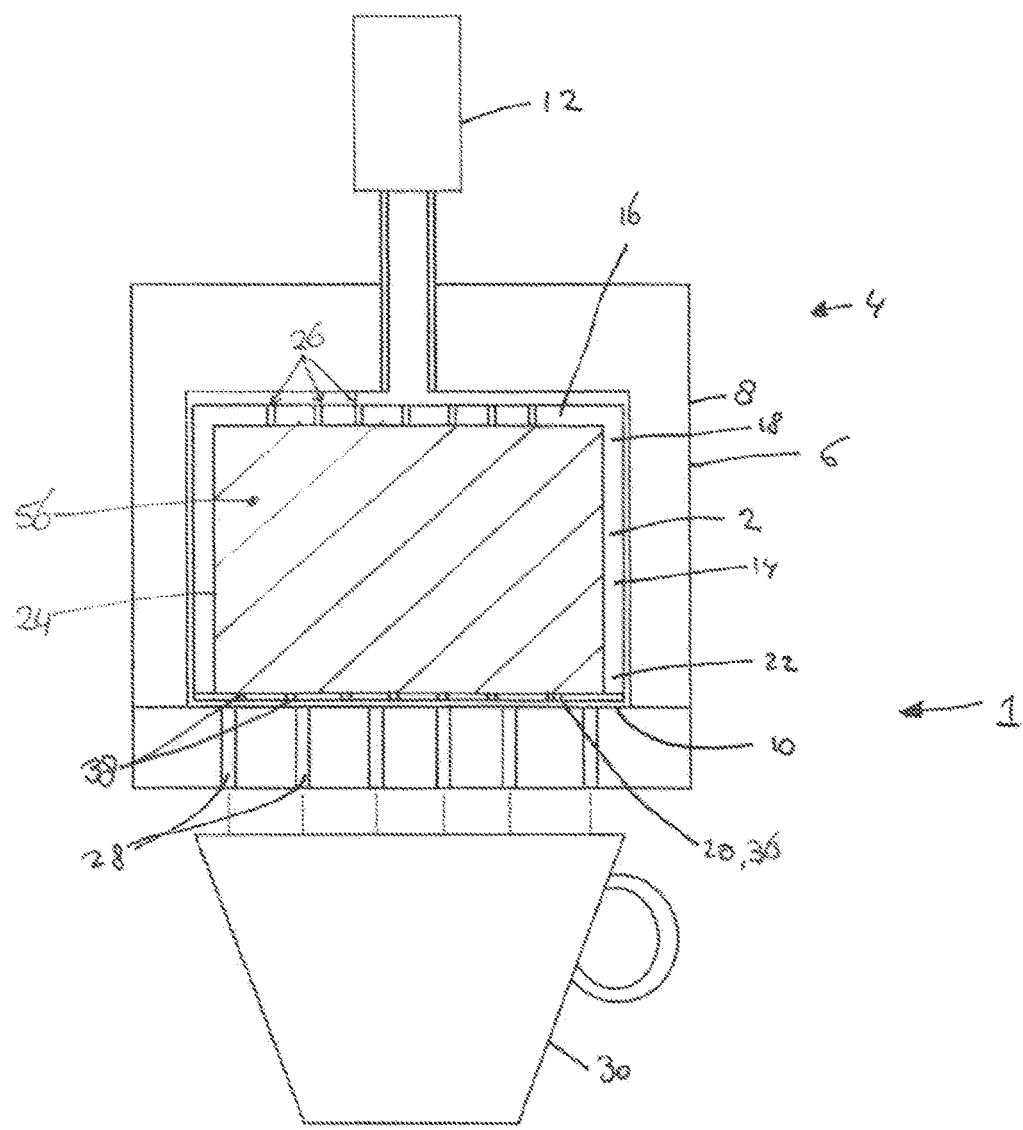
FIG. 1 shows an example of a first embodiment of a system for preparing a beverage according to the invention.

FIG. 1 shows an example of a first embodiment of a system 1 for preparing a predetermined quantity of beverage suitable for consumption using an extractable product according to the invention. The system 1 comprises an exchangeable open capsule 2, and an apparatus 4. The apparatus 4 comprises a receptacle 6 for holding the exchangeable capsule 2. In FIG. 1, a gap is drawn between the capsule 2 and the receptacle 6 for clarity. It will be appreciated that, in use, the capsule 2 may lie in contact with the receptacle 6. In this example the receptacle 6 has a shape complementary to the shape of the capsule 2. In this example the receptacle 6 comprises an upper part 8 and a support surface 10.

The apparatus 4 further comprises a fluid dispensing device 12 for supplying an amount of a fluid, such as hot water, under a high pressure, of e.g. more than approximately six bars (absolute pressure), to the exchangeable capsule 2.

In the system 1 shown in FIG. 1, the exchangeable capsule 2 comprises a substantially rigid circumferential first wall 14, a second wall 16 closing the circumferential first wall 14 at a first end 18, and a third wall 20 closing the circumferential first wall 14 at a second, open, end 22 opposite the second wall 16. The circumferential first wall 14, the second wall 16 and the third wall 20 enclose an inner space 24 comprising the extractable product, in this example roasted and ground coffee. In this example, the exchangeable capsule 2 comprises an amount of extractable product, e.g. approximately 5.0-6.5 grams of roasted and ground coffee, preferably of approximately 5.3 grams±0.2 grams, suitable for preparing a single portion of the beverage, preferably a single cup of the beverage, e.g. from 30-200 ml of the prepared beverage. Dependent on the desired strength of the prepared beverage the amount of extractable product may vary. For instance for preparing a cup of espresso coffee, the capsule 2 may comprise approximately 5.3 grams and for preparing a cup of coffee longo, the capsule 2 may comprise approximately 6.0 grams. In another embodiment of the invention, the capsule may also comprise other amounts between 4.0-8.0 grams of coffee. The inner space 24 may have a volume of approximately 10-14 ml, preferably 11.5-12.5 ml, more preferably approximately 11.8 ml. The exchangeable capsule, thus, is a single-portion-pack. According to a further aspect of the invention, the extractable product in the inner space 24 of the capsule 2 is compacted.

In the example of FIG. 1, the circumferential first wall 14 is substantially rigid. The circumferential first wall 14 may e.g. comprise a plastics material and may be formed by e.g. injection molding, vacuum-forming, thermoforming or the like.

In this example the second wall 16 is integral with the circumferential first wall 14. In this example the second wall 16 is substantially rigid and comprises a plurality of entrance openings 26 for allowing the fluid to enter the capsule 2. The second wall 16 provides an entrance filter of the capsule 2.

In this example the third wall 20 is flexible and sheet-shaped. Further, in this example the third wall is porous. The third wall 20 is in this example manufactured from filtering paper. In this example the filtering paper comprises polyethylene (PE) fibers. In this example the third wall 20 is connected to the circumferential first wall 14 by heat sealing. In this example the third wall 20 forms an outermost boundary of the capsule 2 in an axial direction thereof. It can be seen from FIG. 1 that the third wall 20 abuts against the support surface 10 of the receptacle 6.

The system 1 shown in FIG. 1 is operated as follows for preparing a cup of coffee.

Figure 3:
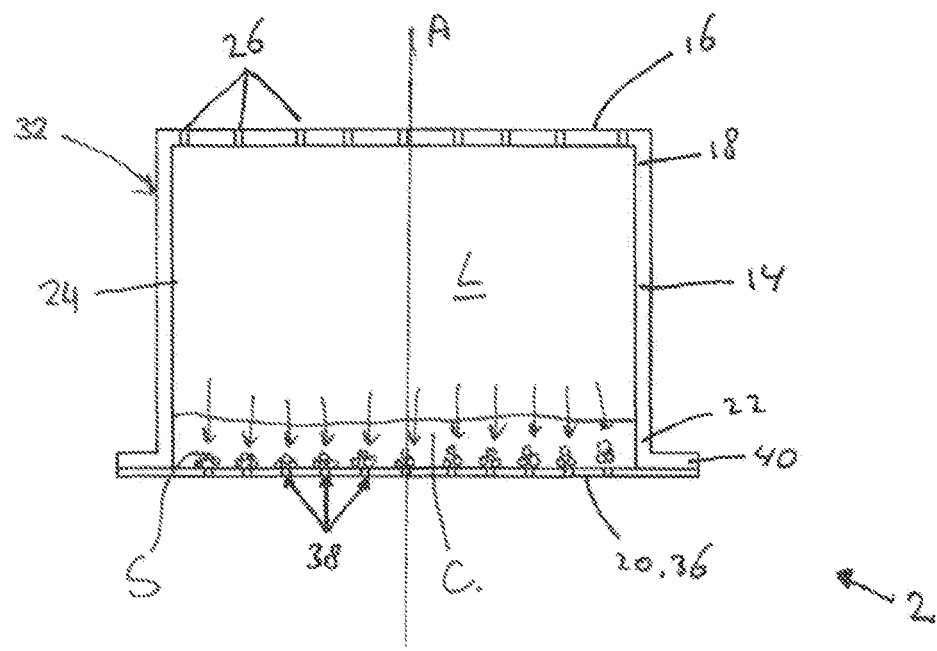
FIG. 3 shows the capsule of FIG. 2 during preparation of a beverage.

The capsule 2 is placed in the receptacle 6. The third wall 20 is brought into abutment with the support surface 10. The fluid, here hot water under pressure, is supplied from the fluid dispensing device 12 to the extractable product in the inner space 24 through the entrance openings 26. The fluid dispensing device 12 may be adapted to supply the water to the exchangeable capsule 2, under a pressure of approximately 4-20 bars, for instance 9-15 bars. Good results have been obtained with the pressure of about 6 bars build-up in the fluid dispensing device. The water will wet the coffee grounds and extract the desired substances to form the coffee beverage. The prepared coffee will drain from the capsule 2 through the porous third wall 20. The coffee beverage is further drained from the receptacle 6 via a plurality of outlets 28, and may be supplied to a container 30 such as a cup. During the supply of the water to the compacted coffee in the inner space of the capsule 2, coffee particles are redistributed in the inner space 24 of the capsule 2, such that a relatively loose coffee bed layer L adjacent the second wall 16 and a relatively compact coffee bed layer C adjacent the third wall 20 is formed (see FIG. 3). The relatively small particles S are displaced together with the water towards the exit filter forming third wall 20 and will be located adjacent openings 38 of the exit filter 20. Said small particles S will together with the exit filter 36 form the flow restriction of the capsule 2 (see FIG. 3) providing a desired pressure drop and thus a desired extraction pressure inside the capsule 2, such that the soluble dry matter from the compacted coffee can be extracted and a cup of beverage with a desired brewing strength and quality is obtained.

In the example of FIG. 1 the plurality of entrance openings 26 is distributed over substantially the entire second wall 16. Thus, the fluid is supplied to the extractable product via the plurality of entrance openings 26, which causes the extractable product to be wetted over substantially the entire cross section of the capsule 2. Hence, a very homogeneous supply of fluid to the extractable product is obtained. Thus, the risk of occurrence of preferential paths via which the fluid flows through the extractable product is greatly reduced.

In another (not shown) embodiment of the capsule 2 according to the invention, the third wall 20, forming the exit filter of the capsule 2, through which the beverage, here coffee, can drain from the capsule 2, is formed by a porous sheet, such as filter paper. The entire third wall 20 may then be formed as the porous sheet. For example, the third wall 20 may form a substantially continuous fluid-permeable sheet spanning substantially the entire second open end 22 of the capsule 2. Thus, the fluid can drain from the capsule 2 over a large area. Hence, a very homogeneous drain of beverage from the extractable product is obtained. Thus, the risk of occurrence of preferential paths via which the fluid flows through the extractable product is greatly reduced.

It will be appreciated that in other not shown embodiments of the system, the apparatus may be different than the apparatus as described in the first embodiment of the system. For instance, the apparatus can be provided with a hollow space between the third wall 20 of the capsule 2 and the outlet openings 28 of the apparatus 4. In another example, the apparatus may comprise piercing means for piercing a lid of a hermetically sealed known capsule. Thus it is noted that the capsule according to the invention can be used in any suitable apparatus for preparing a beverage by using high pressure.

Figure 2:
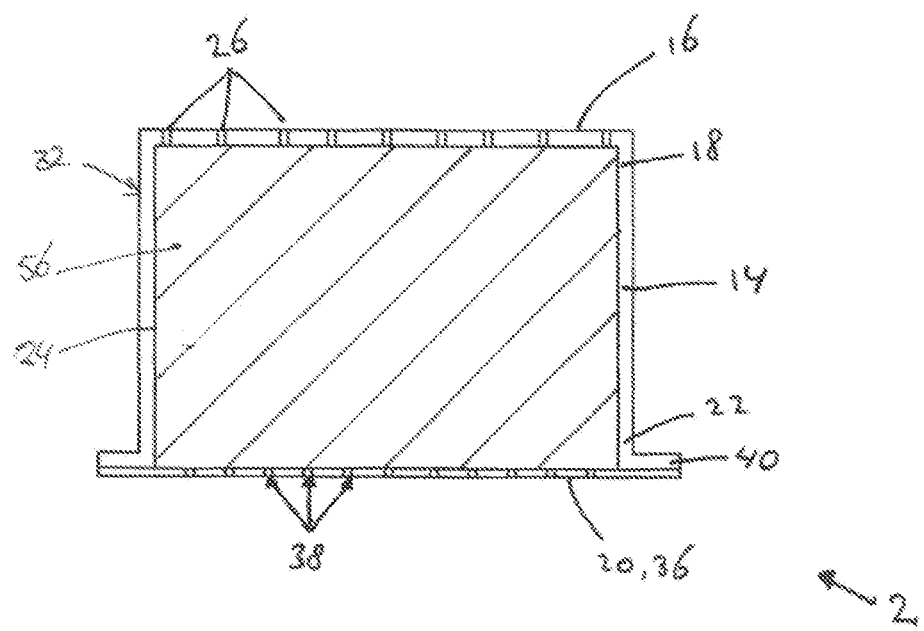
FIG. 2 shows a first embodiment of a capsule according to the invention.

FIGS. 2-5 show embodiments of capsules according to the invention. In FIG. 2 the second wall 16 is integral with the circumferential first wall 14 like in FIG. 1. The second wall 16 comprises the plurality of entrance openings 26 in the second wall 16. The third wall 20 is formed by a flexible foil 36, e.g. a polymeric foil, provided with a plurality of exit openings 38. In FIG. 2 the capsule 2 comprises an outwardly extending rim 40 at the second end 22 of the circumferential first wall 14. The third wall 20 is attached to the outwardly extending rim 40, e.g. by means of gluing, welding, heat sealing, or the like. Hence, the third wall 20 can be firmly attached to the rim 40. It will be appreciated that it is possible that the outwardly extending rim 40 extends between the upper part 8 of the receptacle 6 and the support surface 10 of the receptacle 6, such that the rim 40 is clamped between the upper part 8 and the support surface 10. Hence, the third wall 20 is clamped against the rim 40 in use, i.e. when the fluid pressure is applied, thus reducing the risk of the third wall 20 separating from the rim 40.

Figure 4:
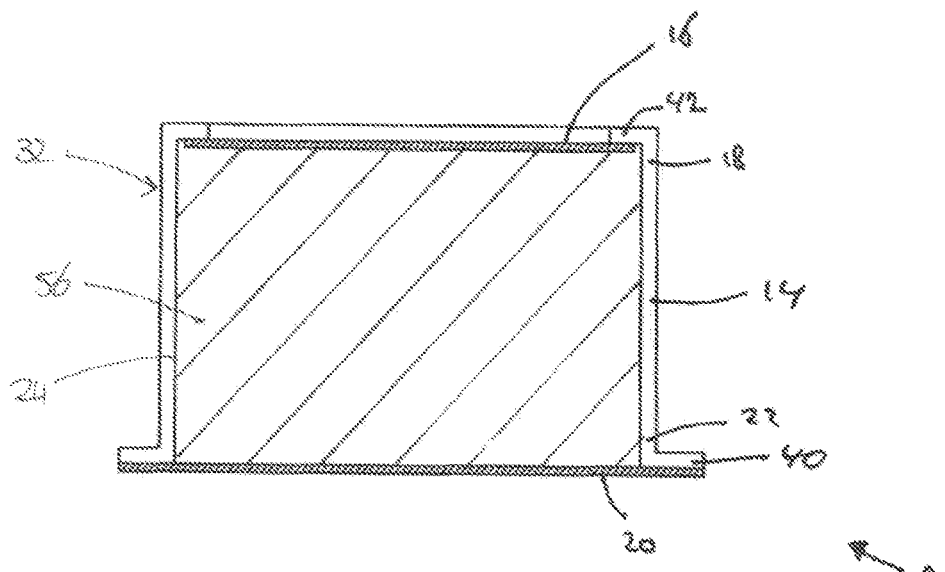
FIG. 4 shows a second embodiment of a capsule according to the invention.

In FIG. 4 the third wall 20 is formed by the flexible porous sheet, such as filter paper. In FIG. 4 the second wall 16 is also formed by a flexible porous sheet, such as filter paper. In this example the second wall 16 is attached to an inwardly extending flange 42. In this example, the second wall 16 is attached to the inner side of the inwardly extending flange 42.

It is appreciated that in other not shown embodiments, the third wall 20 may be formed by a porous sheet such as filter paper or by a polymeric foil, provided with a plurality of exit openings 30, like in FIGS. 1 and 2. It will be appreciated that the capsule 2 may comprise any second wall 16 according to any one of the shown embodiments in combination with any third wall 20 according to any one of the shown embodiments. Preferably, the circumferential first wall 14 is substantially rigid. Hence, the capsule 2 will not be prone to deform by shipping and/or handling, so that the capsule 2 will always fit in the receptacle 6. In addition, the circumferential first wall 14 is preferably resilient, so that any possible deformation of the circumferential first wall 14 will be reversed once the force causing the deformation is removed. Nevertheless, it is possible that the circumferential first wall 14 is formed by a flexible sheet, preferably integral with the second wall 16. Hence, substantially the entire capsule 2 may be manufactured of the flexible sheet, reducing the amount of material required for providing the capsule 2.

In the examples the circumferential first wall 14 is substantially cylindrical. It will be appreciated that the capsule according to the invention is not limited to this shape. The circumferential first wall 14 may e.g. be frustoconical, hemispherical, or polygonal, such as hexagonal, octagonal, etc.

The capsule 2 according to the invention is preferably manufactured by providing a coffee receiving cup 32 comprising the circumferential first wall 14 and the second wall 16. The first wall 14 and the second wall 16 define the inner space 24. Roast and ground coffee starting material, for instance Arabica coffee with a maximum of 30% of Robusta coffee, with a desired particle distribution, a desired moisture content, a desired degree of roast and a desired pouring volume is supplied to the inner space 24 of the coffee receiving cup 32. Then the coffee starting material is compressed by a suitable compression means, for instance with a compression force of approximately 500N. After compression of the coffee in the inner space 24 of the cup, the surface of the compressed coffee facing away from the second wall 16 may be substantially flat. Furthermore, at most a limited amount of coffee particles may be located on a top surface of the circumferential first wall 14 facing away from the second wall 14. In this example of the capsule 2 according to the invention, at most a limited amount of coffee particles may be located on the extending rim 40. Consequently, an exit filter, for instance a polymeric foil layer 36 can be easily provided and sealed in a tight manner onto the extending rim 40 of the circumferential first wall 14 with a minimized risk of occurrence of unsealed areas between the circumferential first wall 14 and the exit filter 20. This results in a capsule 2 having a substantially flat third wall 20, in other words, the third wall 20 will not substantially extend from the circumferential first wall 14 in a direction parallel to a central axis A of the capsule 2 (see FIG. 3). Thus, when using such capsule 2 in an apparatus 4 for preparing a beverage, the capsule 2 can be easily placed in the receptacle 6 without getting stuck due to an extending third wall 20. In an alternative embodiment of the invention it is possible that a first part of the coffee starting material is inserted into the inner space 24 of the capsule 2. This first part of the coffee starting material may be compressed by a suitable compression means, for instance with a compression force of approximately 500N. It will be appreciated that the compression means may rotate during compressions or in intervals between subsequent compressions. This has an advantage that oils may substantially decrease at one hand and that DMA's may increase or stay constant on the other hand. Subsequently, on top of the compressed first part of the coffee starting material a further part of the amount of roast and ground coffee starting material may be provided in the inner space 24 of the capsule 2. Then the further part of the amount of coffee starting material is compressed by a suitable compression means, for instance with a compression force of approximately 500N, such that the further part is compacted. This provides an easy way of inserting and compressing the coffee starting material in the capsule 2. It is also possible that the method for manufacturing the capsule comprises alternately inserting and compressing more than two parts of the amount of coffee starting material inside the capsule 2.

Figure 5:
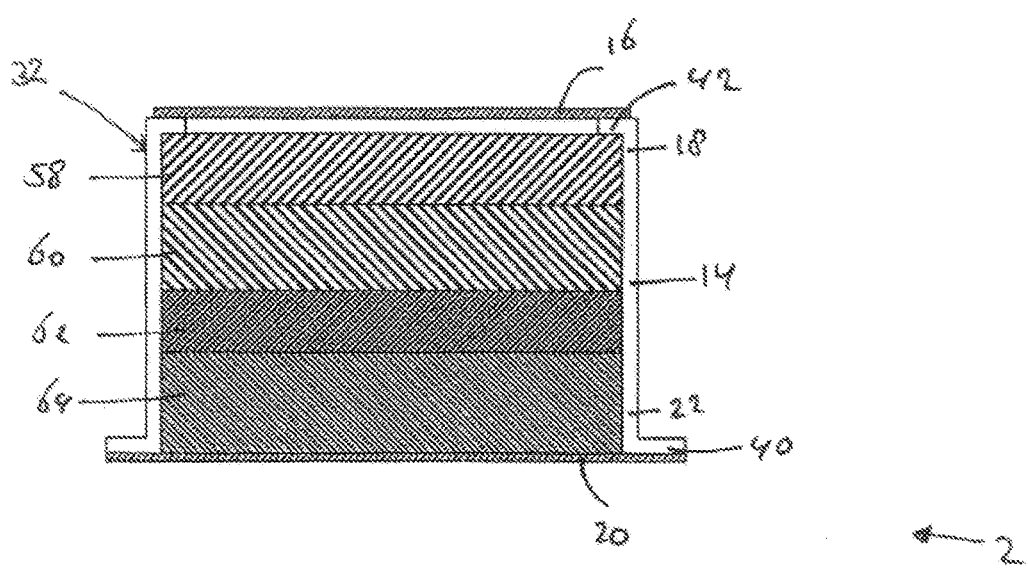
FIG. 5 shows a third embodiment of a capsule according to the invention.

FIG. 5 shows an example of the capsule 2 according to the invention, wherein the extractable product is compacted into a plurality of, in this example four, tablets 58, 60, 62, 64. In FIG. 5 the tablets 58, 60, 62, 64 are stacked inside the inner space 24. In FIG. 5, each tablet 58, 60, 62, 64 spans substantially the entire cross section of the inner space 24 of the capsule 2. In this example a density, i.e. a degree of compaction, of the tablets 58, 60, 62, 64 is different for each of the tablets. The density of the tablets 58, 60, 62, 64 increases in the direction from the second wall 16 to the third wall 20. This provides the advantage that the fluid will more easily wet a tablet of lower density than a tablet of higher density, so that each upstream tablet has been properly wetted while the water wets a subsequent downstream tablet. Thus, highly homogeneous wetting of the extractable product is achieved. Although the example shows four stacked tablets, it will be appreciated that any number of tablets may be used.

Figure 6:
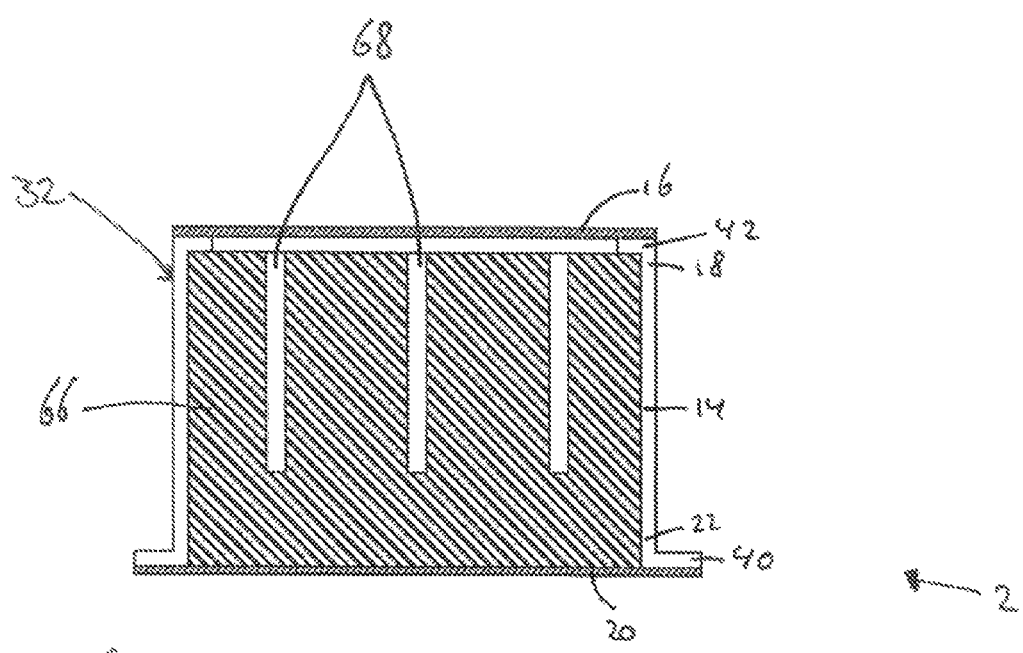
FIG. 6 shows a fourth embodiment of a capsule according to the invention.

FIG. 6 shows an example of a capsule 2 comprising a single tablet 66 of compacted extractable product. In the example of FIG. 6 the tablet 66 comprises bores 68 extending into the tablet 66 from the side of the tablet 66 facing the second wall 16 in the direction of the third wall 20. The length of the bores 68 is shorter than the thickness of the tablet 66 in the direction along the bore 68. Thus, the bores 68 do not form shortcut passages for the fluid through the tablet 66, but provide the fluid a passage into the core of the tablet 66. These bores 68 allow a predetermined penetration of the fluid into the tablet. Thus, a preferred wetting of the compacted extractable product may be obtained.

It will be appreciated that the tablet 66 or plurality of tablets 58, 60, 62, 64 may be used in conjunction with any capsule 2 referred to hereinabove. It will also be appreciated that if the extractable product is compacted into the tablet(s) the second wall 16 of the capsule is not strictly required, since the extractable product is not likely to spill from the capsule 2 prior to use.

In the foregoing specification, the invention has been described with reference to specific examples of embodiments of the invention. It will, however, be evident that various modifications and changes may be made therein without departing from the broader spirit and scope of the invention as set forth in the appended claims.

It is for instance possible that the capsule is contained in an air tight wrapping prior to use to improve shelf-life.

It is for instance possible that the capsule 2 is manufactured from biodegradable materials.

It is for instance possible that the capsule 2 has different dimensions or different shapes.

It further may be possible that the coffee is compacted in the inner side of the capsule by using different suitable apparatuses for compacting The coffee may, in an alternative embodiment of the invention, be compacted before being supplied to the inner space of the capsule. For instance, by first compressing the coffee into a tablet with dimensions corresponding with dimensions of an inner space of a coffee receiving cup of the capsule.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A capsule for preparing a predetermined quantity of beverage suitable for consumption using an extractable product, the capsule comprising:
   a circumferential first wall,
   a second wall closing the circumferential first wall at a first end,
   a perforated and/or porous third wall closing the circumferential first wall at a second, open, end opposite the second wall arranged for draining the prepared beverage from the capsule,
   wherein the first, second and third wall enclose an inner space comprising the extractable product,
   wherein the extractable product in the inner space of the capsule has been, at least partly compacted,
   wherein the third wall comprises an exit filter arranged for draining prepared beverage from the capsule, wherein the exit filter is formed by filtering paper or a polymeric film provided with a plurality of exit openings, and wherein the exit filter and the extractable product in combination provide a fluid restriction resulting in an increase in extraction pressure within the inner space of the capsule;
   wherein the extractable product comprises roast and ground coffee;
   wherein prior to use the roast and ground coffee is compressed such that a first portion of the roast and ground coffee is compacted to a first compaction density and a second portion of the roast and ground coffee is compacted to a second compaction density greater than the first compaction density such that the compaction density of the extractable product increases toward the third wall; and
   wherein the capsule comprises an entrance filter, wherein prior to use the entrance filter has a flow resistance that is lower than the flow resistance of the compacted extractable product in combination with the exit filter.

2. The capsule according to claim 1, wherein the inner space of the capsule has a volume of approximately 10-14 ml.

3. The capsule according to claim 2, wherein the inner space of the capsule has a volume of 11.5-12.5 ml.

4. The capsule according to claim 2, wherein the inner space of the capsule has a volume of approximately 11.8 ml.

5. The capsule according to claim 1, wherein the entire inner space is occupied by the extractable product.

6. The capsule according to claim 1, wherein the roast and ground coffee has been obtained by compacting a coffee starting material having a particle size distribution by weight, wherein a 10th percentile thereof of the particle size is 20-60 µm, wherein a 50th percentile of the particle size is 370-570 µm, and wherein a 90th percentile of the particle size is 600-800 µm.

7. The capsule according to claim 6, wherein the roast and ground coffee has been obtained by compacting a coffee starting material having a particle size distribution by weight, wherein a 10th percentile thereof of the particle size is 20-40 µm, wherein a 50th percentile of the particle size is 370-490 µm and wherein a 90th percentile of the particle size is 600-700 µm.

8. The capsule according to claim 1, wherein the exit filter comprises 110-150 openings.

9. The capsule according to claim 8, wherein the exit filter comprises approximately 145 openings.

10. The capsule according to claim 1, wherein the first circumferential wall is substantially rigid.

11. The capsule according to claim 1, wherein the compacted extractable product is provided in a tablet.

12. The capsule according to claim 1, wherein the tablet comprises at least one bore extending from the side of the tablet facing the second wall in the direction of the third wall.

13. The capsule according to claim 1, wherein the extractable product is compacted into a plurality of tablets.

14. The capsule according claim 13, wherein a compaction density increases from the second wall of the capsule towards the third wall of the capsule.

15. The capsule according to claim 13, wherein the extractable product is compacted into a plurality of tablets of mutually different packing density.

16. The capsule according to claim 1, wherein the at least partially compacted extractable product has a particle size distribution by weight wherein a 10th percentile of the particle size is 20-60 µm, wherein a 50th percentile of the particle size is 400-600 µm, and wherein a 90th percentile of the particle size is 700-1000 µm.

17. The capsule according to claim 16, wherein the at least partially compacted extractable product has a particle size distribution by weight wherein a 10th percentile of the particle size is 20-40 µm wherein a 50th percentile of the particle size is 450-550 µm and wherein a 90th percentile of the particle size is 825-950 µm.

18. The capsule according to claim 1, wherein the opening diameter is approximately 0.3 mm±0.05 mm.

19. The capsule according to claim 1, wherein the capsule comprises 5.0-6.5 grams of roast and ground coffee.

20. The capsule according to claim 1, wherein the capsule comprises approximately 5.3 grams±0.2 grams roast and ground coffee.

* * * * *